(12) United States Patent
Kaul et al.

(10) Patent No.: US 12,219,018 B2
(45) Date of Patent: Feb. 4, 2025

(54) ENHANCED MESSAGING AS A PLATFORM

(71) Applicant: T-Mobile USA, Inc., Bellevue, WA (US)

(72) Inventors: Mayank Kaul, Renton, WA (US); Chung Yi Lu, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 66 days.

(21) Appl. No.: 17/982,464

(22) Filed: Nov. 7, 2022

(65) Prior Publication Data

US 2023/0069181 A1    Mar. 2, 2023

Related U.S. Application Data

(63) Continuation of application No. 17/017,078, filed on Sep. 10, 2020, now Pat. No. 11,496,575.

(51) Int. Cl.
| | |
|---|---|
| *H04L 67/141* | (2022.01) |
| *G06F 9/54* | (2006.01) |
| *H04L 12/14* | (2024.01) |
| *H04L 41/0806* | (2022.01) |
| *H04L 51/02* | (2022.01) |
| *H04L 51/046* | (2022.01) |
| *H04L 67/1097* | (2022.01) |
| *H04L 67/306* | (2022.01) |

(52) U.S. Cl.
CPC ............ *H04L 67/141* (2013.01); *G06F 9/546* (2013.01); *G06F 9/547* (2013.01); *H04L 12/1407* (2013.01); *H04L 41/0806* (2013.01); *H04L 51/02* (2013.01); *H04L 51/046* (2013.01); *H04L 67/1097* (2013.01); *H04L 67/306* (2013.01)

(58) Field of Classification Search
CPC ............... H04L 67/141; H04L 12/1407; H04L 41/0806; H04L 51/02; H04L 51/046; H04L 67/1097; H04L 67/306; G06F 9/546; G06F 9/547
See application file for complete search history.

(56) References Cited

U.S. PATENT DOCUMENTS

| | | |
|---|---|---|
| 8,122,144 B2 | 2/2012 | Borgendale |
| 8,280,943 B1 | 10/2012 | Saedifaez |
| 9,591,484 B2 | 3/2017 | Ionescu |

(Continued)

OTHER PUBLICATIONS

Office Action (Notice of Allowance and Fees Due (PTOL-85)) dated Jul. 5, 2022 for U.S. Appl. No. 17/017,078 (pp. 1-8).

(Continued)

*Primary Examiner* — Raqiul A Choudhury
(74) *Attorney, Agent, or Firm* — Lee & Hayes, P.C.

(57) ABSTRACT

Aspects of the invention enhance the capabilities of the Message as a Platform ("MaaP") by adding interfaces thereto so that the platform directly interfaces with the Online Charging System ("OCS"), the Policy and Charging Rules Function ("PCRF"), the Equipment Identity Register ("EIR"), the Cloud Database ("CDB") and the Home Subscriber Server ("HSS") without middle layer or without using Rich Communication Services ("RCS") as an intermediary. Moreover, embodiments of the invention may create a user interface of the MaaP so that users may configure parameters to interact with the network nodes right from the user interface.

18 Claims, 6 Drawing Sheets

(56) References Cited

U.S. PATENT DOCUMENTS

| | | |
|---|---|---|
| 10,013,705 B2 | 7/2018 | Mikurak |
| 11,496,575 B2 | 11/2022 | Kaul |
| 2004/0013258 A1 | 1/2004 | Cotte |
| 2004/0030750 A1 | 2/2004 | Moore |
| 2005/0144291 A1 | 6/2005 | Frank |
| 2006/0075389 A1* | 4/2006 | Itoh .................. G06F 8/10 717/126 |
| 2008/0141273 A1 | 6/2008 | Borgendale |
| 2009/0245500 A1 | 10/2009 | Wampler |
| 2009/0310596 A1* | 12/2009 | Joyce ............... H04L 12/2801 370/352 |
| 2012/0324009 A1* | 12/2012 | Lee .................. G06Q 50/01 709/204 |
| 2014/0012999 A1 | 1/2014 | Chang |
| 2014/0115077 A1 | 4/2014 | Cunningham |
| 2014/0181233 A1 | 6/2014 | Peev |
| 2014/0189027 A1 | 7/2014 | Zhang |
| 2014/0222610 A1 | 8/2014 | Mikurak |
| 2014/0325078 A1 | 10/2014 | Shan |
| 2015/0244653 A1 | 8/2015 | Niu |
| 2015/0294124 A1* | 10/2015 | Gordon ............. H04W 12/126 726/35 |
| 2015/0373148 A1 | 12/2015 | He |
| 2016/0127553 A1 | 5/2016 | McCormack |
| 2016/0182658 A1 | 6/2016 | Allinson |
| 2016/0286027 A1* | 9/2016 | Lee .................. H04M 1/72436 |
| 2016/0381091 A1 | 12/2016 | O'Connor |
| 2017/0048170 A1 | 2/2017 | Smullen |
| 2017/0180284 A1 | 6/2017 | Smullen |
| 2017/0324868 A1 | 11/2017 | Tamblyn |
| 2018/0005538 A1 | 1/2018 | Rockett |
| 2018/0049086 A1* | 2/2018 | Bouvet ............. H04W 36/0055 |
| 2018/0212904 A1* | 7/2018 | Smullen ............ H04L 69/14 |
| 2018/0262513 A1 | 9/2018 | Gorter |
| 2019/0095289 A1* | 3/2019 | Kumar .............. G06F 11/1451 |
| 2020/0104192 A1* | 4/2020 | Siddhartha ......... G06F 3/04842 |
| 2021/0105236 A1* | 4/2021 | Abdelmalek ........ H04L 67/02 |
| 2022/0078245 A1 | 3/2022 | Kaul |
| 2022/0300960 A1* | 9/2022 | Gutzeit ............. G06Q 20/40 |

OTHER PUBLICATIONS

Office Action dated Oct. 28, 2021 for U.S. Appl. No. 17/017,078 (pp. 1-13).

* cited by examiner

ENHANCED MESSAGING AS A PLATFORM

CROSS-REFERENCE TO RELATED APPLICATION

The is a continuation application of U.S. patent application Ser. No. 17/017,078, filed on Sep. 10, 2020, whose disclosure is incorporated by reference in its entirety herein.

TECHNICAL FIELD

The present invention generally relates to rich message exchanges. In particular, embodiments of the invention relate to rich message exchanges in mobile technology.

BACKGROUND

Messaging as a Platform (MaaP) is a messaging system built upon the technical foundation established by a universal profile of a Rich Communication Services (RCS). The MaaP interfaces with the RCS and various vendors build functionalities on the RCS to provide features to third parties who may use MaaP. However, these functionalities on the RCS fail to directly connect the MaaP to network nodes, such as an online charging system (OCS), a Policy and Charging Rules Function (PCRF), an Equipment Identity Register (EIR), a Cloud Database (CDB), and Home Subscriber Server (HSS).

SUMMARY

Aspects of the invention enhance the capabilities of the MaaP by adding interfaces thereto so that the platform directly interfaces with the OCS, the PCRF, the EIR, the CDB and the HSS without middle layer or without using RCS as an intermediary. Moreover, embodiments of the invention may create a user interface of the MaaP so that users may configure parameters to interact with the network nodes right from the user interface.

BRIEF DESCRIPTION OF DRAWINGS

Persons of ordinary skill in the art may appreciate that elements in the figures are illustrated for simplicity and clarity so not all connections and options have been shown. For example, common but well-understood elements that are useful or necessary in a commercially feasible embodiment may often not be depicted in order to facilitate a less obstructed view of these various embodiments of the present disclosure. It may be further appreciated that certain actions and/or steps may be described or depicted in a particular order of occurrence while those skilled in the art may understand that such specificity with respect to sequence is not actually required. It may also be understood that the terms and expressions used herein may be defined with respect to their corresponding respective areas of inquiry and study except where specific meanings have otherwise been set forth herein.

DETAILED DESCRIPTION

Embodiments may now be described more fully with reference to the accompanying drawings, which form a part hereof, and which show, by way of illustration, specific exemplary embodiments which may be practiced. These illustrations and exemplary embodiments may be presented with the understanding that the present disclosure is an exemplification of the principles of one or more embodiments and may not be intended to limit any one of the embodiments illustrated. Embodiments may be embodied in many different forms and should not be construed as limited to the embodiments set forth herein; rather, these embodiments are provided so that this disclosure may be thorough and complete, and may fully convey the scope of embodiments to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

Figure 1:
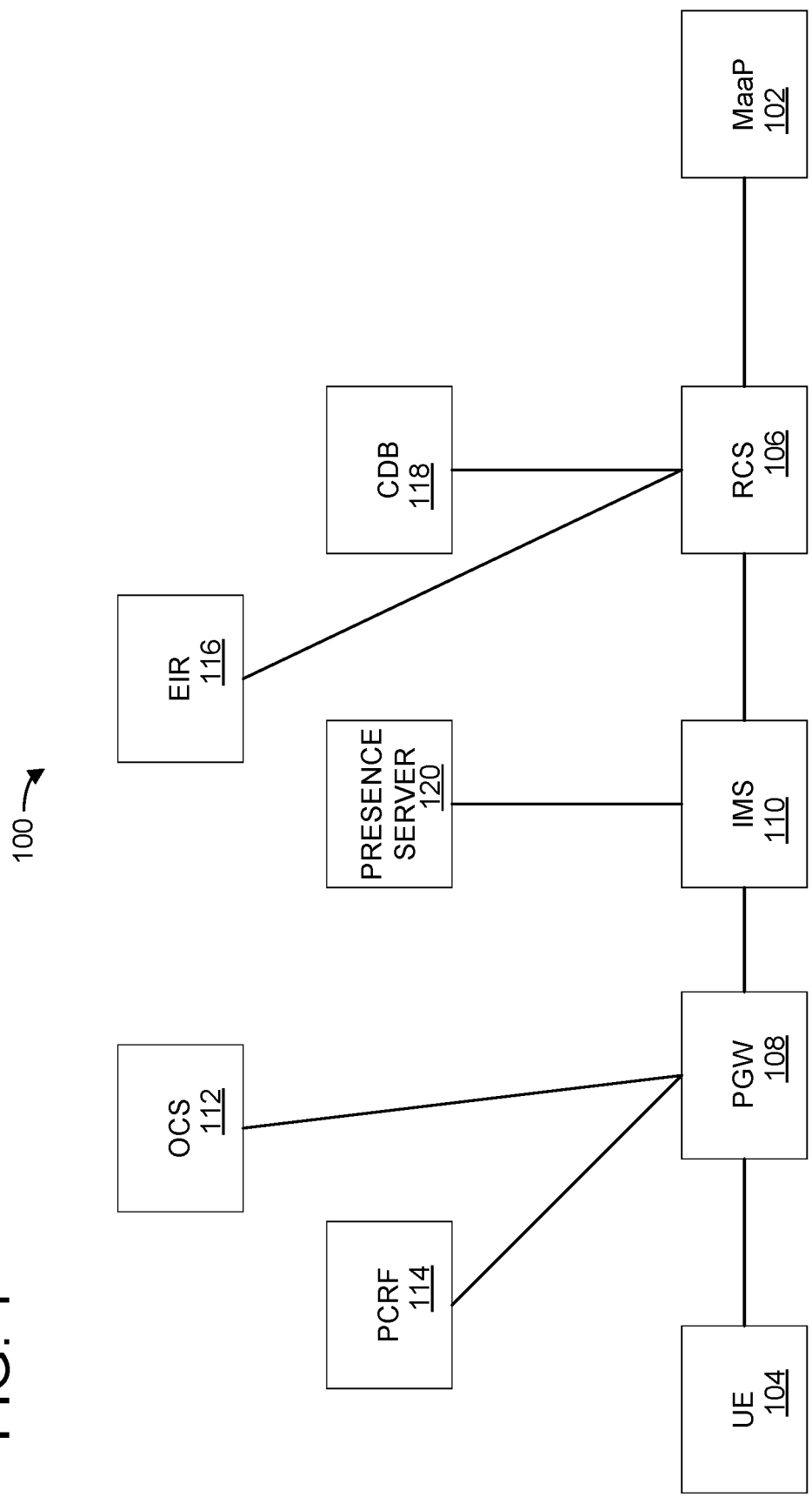
FIG. 1 is a diagram illustrating an existing approach to a system having a messaging as a platform.

Referring now to FIG. 1, a diagram illustrates an existing approach 100 to use a messaging as a platform (MaaP) 102 to exchange rich messages in a mobile network setting from a user equipment (UE) 104. The MaaP 102 is a messaging system that is built upon the technical foundation established by a universal profile of a Rich Communication Services (RCS) 106. When a user uses the UE 104 to send a message, the message may first travel to a packet data network gateway (PGW) 108 before reaching an IP multimedia subsystem (IMS) 110. In one embodiment, the IMS 110 may also interface with a presence server 120 as part of provision of services of the IMS 110. At the IMS 110, the message may be further routed to the RCS 106 before reaching the MaaP 102 for processing.

In such approach, the MaaP 102 interfaces with the RCS 106 and various vendors build functionalities on the RCS 106 to provide features to third parties who may use the MaaP 102. For example, the functionalities on the RCS 106 may include capabilities to interface with an online charging system (OCS) 112, a Policy and Charging Rules Function (PCRF) 114, an Equipment Identity Register (EIR) 116, a Cloud Database (CDB) 118, or a Home Subscriber Server (HSS). These services enable, among other things, operators to seamlessly incorporate traditional SMS and MMS services, and connect to a third party or OTT applications. In such implementation, vendors may provide a universal profile to provide a consistent experience that supports the MaaP enabling use of chatbots or other artificial intelligence services and allowing businesses to realize the application-to-person (A2P) potential of IP messaging.

Furthermore, vendors may create application program interfaces (APIs) to open RCS features for branded development, accesses, interoperability and connections to the RCS A2P Hubs. APIs may be efficient and reduce errors but receiving data in an expected format and returning data in an additional expected format. By using a known format, errors in communicating and interpreting data may be reduced. In another example, brand owners may pay operators for access to mobile subscribers via the RCS 106, and other accesses across different industries.

However, these functionalities and approaches center on the RCS. The RCS 106 may provide the conduit, but these desirable functionalities and features fail to directly connect the MaaP to network nodes. The separate construct, such as the universal profile built separately and associated with the RCS 106 may be prone to hacking attacks, synchronization failures, and other issues that could interfere with the desirable functionalities.

Therefore, an enhanced MaaP is needed to provide a better technical solution to expanding use of the MaaP.

Figure 2:
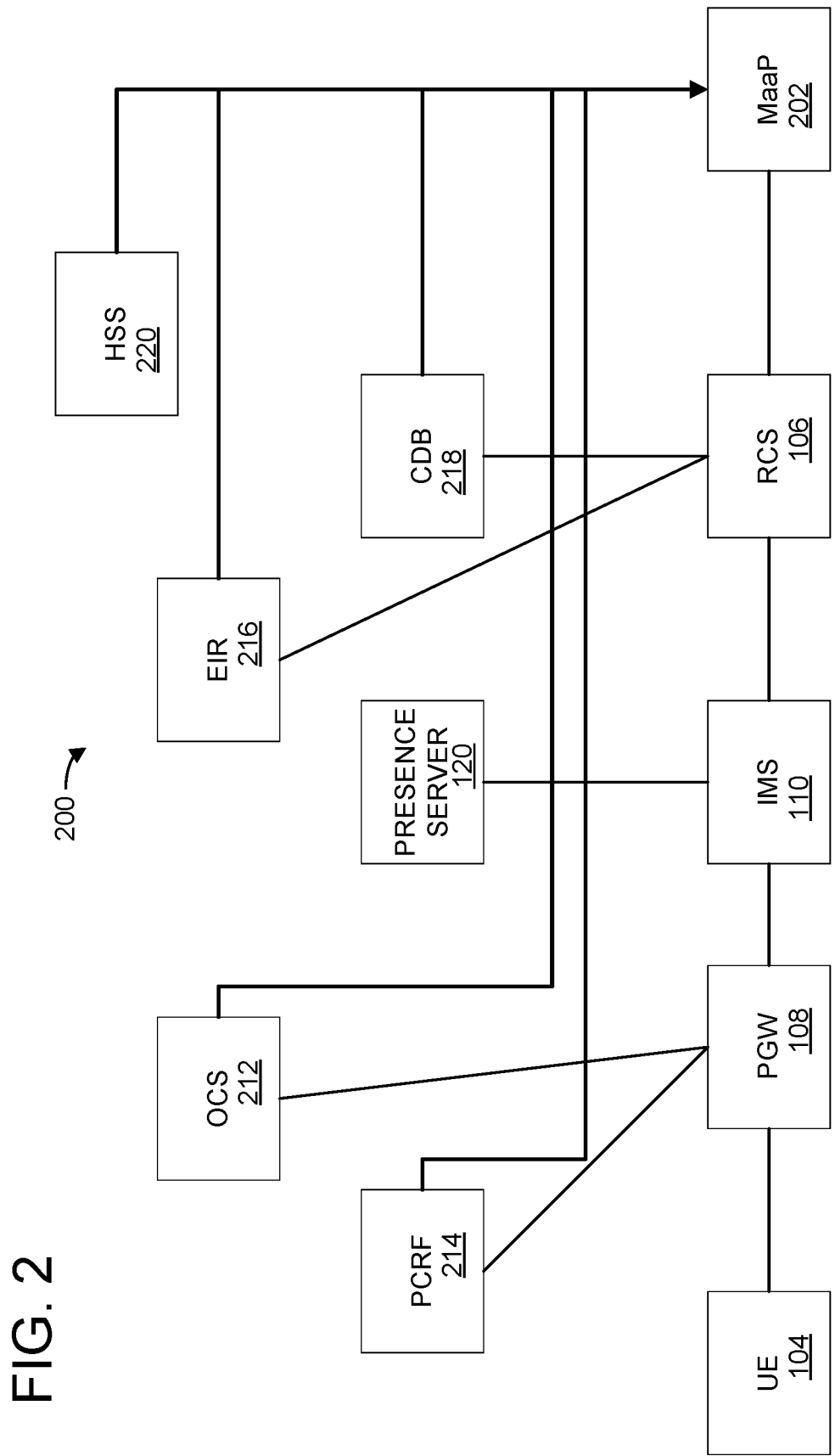
FIG. 2 is a diagram illustrating a system having an enhanced MaaP according to some embodiments.

In some embodiments, referring now to FIG. 2, a diagram illustrates a system 200 having the MaaP 202 directly connect with service providers that bypass intermediary constructs or software add-ons. Instead, aspects of some embodiments reconfigure the MaaP 202 to interface the different variables directly with the service providers, such as but not limited to:

Build connectivity from MaaP server to an OCS 212,
Build connectivity from MaaP Server to a PCRF 214,
Build connectivity from MaaP Server to a EIR 216,
Build connectivity from MaaP to a CDB 218, or
Build connectivity from MaaP to a HSS 220.

Logically, other services providers may also be connected. In some embodiments, the enhancements on the MaaP 202 may provide application programming interfaces (APIs). For example, to interface with the HSS 220, an API for the HSS 220 may enable communications of one or more parameters or data types, such as:

Repository data: contains transparent data related to the service;

Public identifiers: contains a list of Public User Identity (PUI) associated to the user;

IMS User State: contains the information about IMS User State of the public identifiers; the possible values are:
REGISTERED,
NOT_REGISTERED,
AUTHENTICATION_PENDING,
REGISTERED_UNREG_SERVICES; and
S-CSCF Name: may contain the address of the S-CSCF allocated to the user;

Initial Filter Criteria: may contain the triggering information for the service; an AS can only get the initial filter criteria related to the service provided;

Location Information: may contain the location information related to the user that could be located in Circuit-Switched (CS) or Packet-Switched (PS) domain;

User State: may contain the state of the user in the CS/PS domain;

Charging information: may contain the address of charging function; and

MSISDN: may contain the MSISDN associated with the Public User Identity.

In one embodiment, the following may be an example of snippet of interface data packet or stream between the MaaP 202:

...4...2....9.s.[..N....@..7smIsi201.smsc.sms.operatorcom; 1538152955;469
32.....@..&smIsi201.smsc.sms.operator.com.....
(@...sms.operator.com....@..*vcd
b.mnc300.mcc310.3gppnetwork.org......@..      ...@.....
(.....@...........@..................(..............$..(..............
(.14693639999............(.SMS
SUBPROFILE......@..2....9.s.
[..N....@..7smIsi201.smsc.sms.operatorcom;1538  152955;
46932.....@...........@...ce01.ngcdbpollab1.msg.lab.operator.
com.....(@...                                msg.lab.t-
mobile.com....@..&smIsi201.smsc.sms.operator.com......@
..:mp1.daIdra01.dra.e
pc.mnc300.mcc310.3gppnetwork.org......@..      ...@.....
(.....@...........@.................(.<?xml        version="1.0"
encoding="UTF-8"?><Sh-
Data><PublicIdentifiers><MSISDN>14693638739</
MSISDN></
PublicIdentifiers><RepositoryData><ServiceIndication>
SMS_SUBPROFILE</
ServiceIndication><SequenceNumber>10</
SequenceNumber><ServiceData><Subscriber
version="1.0"><MSISDN>14693639999</
MSISDN><IMSI/><SubStatus>ACT</
SubStatus><Language>En</
Language><SubType>POSTPAID</
SubType><OperatorId>OPERATOR_A</
OperatorId><isPh2User>0</isPh2User><isUccUser>0</
isUccUser><isMsimBarredUser>0</
isMsimBarredUser><IMSEnabled>1</
IMSEnabled><SMSCSubProfileID>30</
SMSCSubProfileID><isGearOn>1</
isGearOn><migrationStatus>2</
migrationStatus><pnbEnabled>0</
pnbEnabled><rcsMigration>0</rcsMigration></
Subscriber></ServiceData></RepositoryData></Sh-
Data>...

As illustrated above, information such as MSISDN, language information, IMS, subscriber profile information, etc., may be interfaced and APIs may be used to parse the data packet.

In one embodiment, the above snippet example may include XML tags and syntax. It is to be understood other structured language composition may be used without departing from the scope and spirit of the invention.

In another embodiments, the MaaP 202 may, through an API, may identify a user or subscriber profile to determine the routing logic and response to the chatbots that also interface with the MaaP. It is to be noted that the profile discussed is not the universal profile used in the RCS implementation. In other words, the user or subscriber profile discussed in this embodiment may be a profile that the UE, or the IMS 110 have already stored and used. Therefore, no additional profile is needed to storage or update. The enhanced MaaP 202 may apply existing infrastructure while adding capabilities when interfacing with the HSS 220, the CDB 218, the EIR 216, the PCRF 214, and the OCS 212.

In yet additional embodiments, the enhanced MaaP 202 may facilitate communications and interactions between the UE and the chatbots. Currently, chatbot capabilities may be provided where either Over The Top (OTT) applications or third party features in the RCS 106 are interfacing with the UE 104. For example, messages or data packets exchanged between the UE and chatbos may be received via dedicated applications or apps that are installed on the UE and provided to a portal to the chatbots. With the enhanced MaaP 202, aspects of the invention may provide a common platform for such exchange. In one embodiment, with the MaaP 202, via APIs, may provide chatbots information such as user or subscriber capability, under the application-to-person messaging approach.

Moreover, the MaaP 202 may support the following interfaces to the external network functions for user/subscriber profile lookup including the network status (e.g., roaming or in-network), charging type (e.g., Prepaid or Postpaid), operator ID (e.g., TMUS, Metro, MVNOs, etc.), Device Type (e.g., handset models), Language Preference (e.g., English, Spanish, French, German, etc.):

PCRF—via Diameter interface
CDB—via Diameter interface
HSS
EIR
OCS

In one embodiment, the MaaP 202 may use SIP INVITE User-Agent and

P-Access-Network-Info headers to know the user device information and MCC/MNC information when they are required for routing logic decision.

In one example, the header may include information such as:

User-Agent: [[carrier or operator name, such as OPERATOR A]]

[[Network capability information, such as "VoLTE-RCSUP-ePDG-IR94-RTT-ussd SEC/SM-F707U F707USQU1ATGD"]]

P-Access-Network-Info: [[network band information, such as "3GPP-E-UTRAN-FDD; utran-cell-id-3gpp=3102602c3414b1202"]]

In some embodiments, the MaaP 202 may support flexible routing rules based upon the above external network function's response (e.g., AAA or UDA). For example, if a chatbot interfacing with the MaaP 202 is designed to send A2P messages to Non-roaming, Post-paid subscribers who are under operator A with the Digits App/client, the MaaP 202 may be able to either silence drop or reject with predefined error-code to a chatbot request when the user/subscriber does not meet with the above factors.

In yet another embodiments, when onboarding a chatbot, chatbot information about which location/area the chatbot may be visible to the users/subscribers may be accessed by the MaaP 202. The MaaP 202 may provide a list of options for multiple selection from a predefined/configurable drop-down menu. The default selection shall be All areas.

In a further embodiment, the MaaP 202 may support flexible routing rules based upon a handover "ho" parameter (e.g., as defined in RCC.07) sent to MaaP in query parameters for the client to a directory query. In some embodiments, the MaaP may respond with the chatbot list based upon the chatbot served location/area information required at the above onboarding process.

In yet another embodiment, the MaaP 202 may support configurable response action for the cases when the users/subscribers send messages to A2P-Only chatbots:

Config 1: Message is dropped with SIP 403 error returned
Config 2: Message is Accepted, and proceed P2A as usual
Config 3: Message is Accepted, Not proceed P2A, silence drop
Config 4: Message is Accepted, Not proceed P2A, response with pre-config/cam messages, and drop the message.

In yet another embodiment, the MaaP 202 may support user/subscriber capability discovery API in list/group/bunch mode. For A2P-Only chatbot, for example, the MaaP 202 may provide a customized API that an aggregator may send a Mobile Station International Subscriber Directory Number (MSISDN) list for the user capability discovery for efficient A2P messages delivery.

Figure 3:
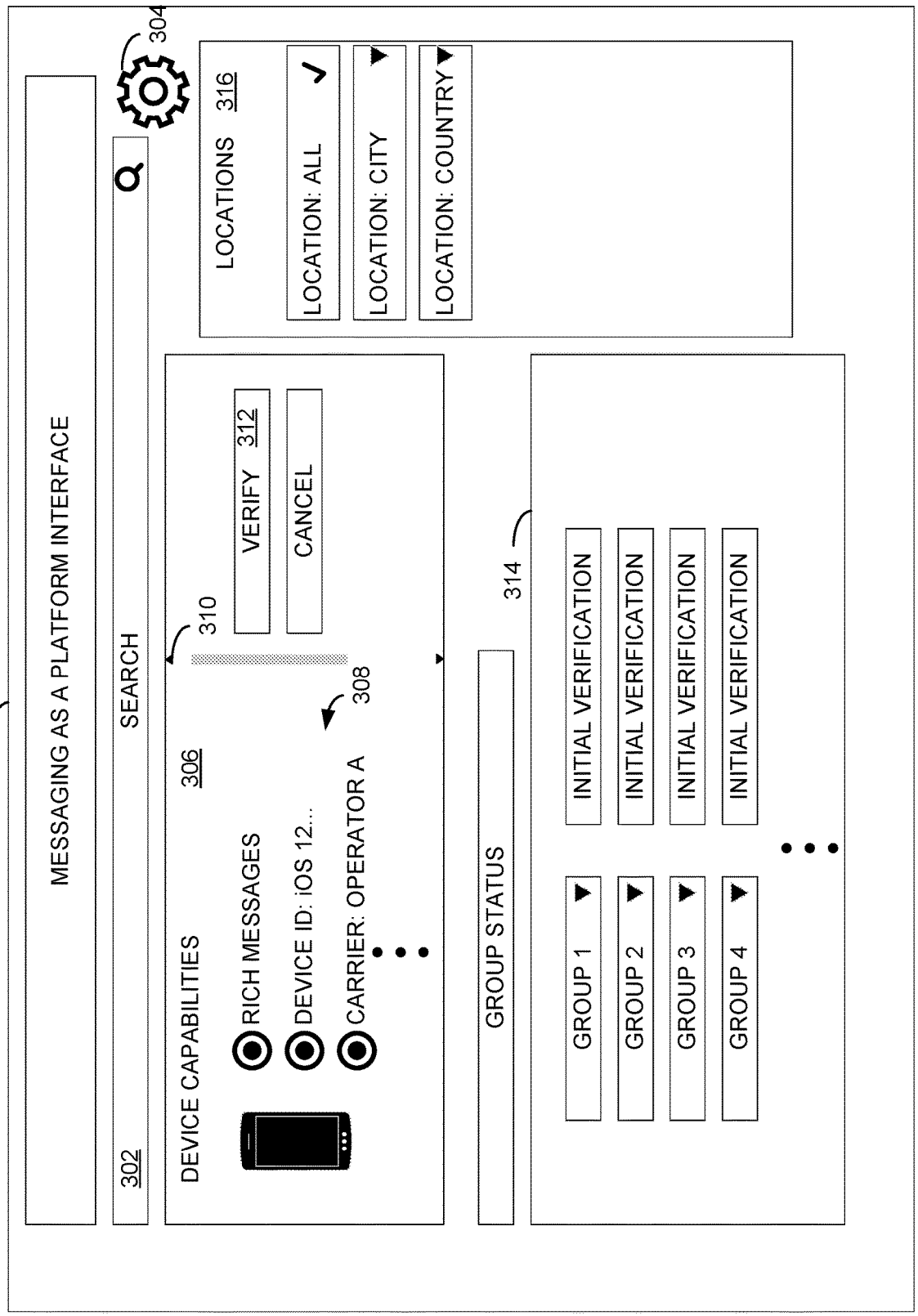
FIG. 3 is a diagram illustrating a user interface for an enhanced MaaP according to some embodiments.

Referring now to FIG. 3, a screenshot 300 of a user interface for a user, such as a brand owner, to interact with features of the enhanced MaaP, such as the MaaP 202, according to some embodiments. In one embodiment, the screenshot 300 may expose one or more values or parameters of APIs for the MaaP 202 when interfacing with one or more network nodes.

For example, the interface 300 may include a search bar 302 that may provide the user to search for the different values of APIs for the MaaP, so that the user may use these values to settings. In another embodiment, the interface 300 may further provide a configuration button 304 that may organize the various configuration settings or values in one location.

One of the features or aspects of the invention may be to provide the interface 300 for the user to pre-check capabilities of UEs. For example, suppose a brand owner wishes to provide rich interactive messages or texts to a collection of UEs that may be subscribers of a given operator, such as operator A. Therefore, the user may perform such pre-delivery verification in a pane 306. The interface 300 may provide a set of configuration values that may identify UEs. For example, radio buttons may list values or configurations such as: "Rich Message Capabilities," "Device ID," "Carrier name," or the like. The user may also use a scroll bar 310 to scroll down to identify additional values or settings. Once, the features have identified, the user may select a verification button 312 to verify that these devices are capable to receive these desirable messages.

In another embodiment, the user may further configure the devices as a group in the pane 314. In some embodiments, the interface 300 may provide one or more groups to be selected from so that the user may verify the UEs in the group are capable to receive the messages. In one alternative embodiment, the user may create new groups by selecting the configuration button 304.

In a further embodiment, the user may also restrict geographical regions or locations by selecting one or more options in a location pane 316.

Figure 4:
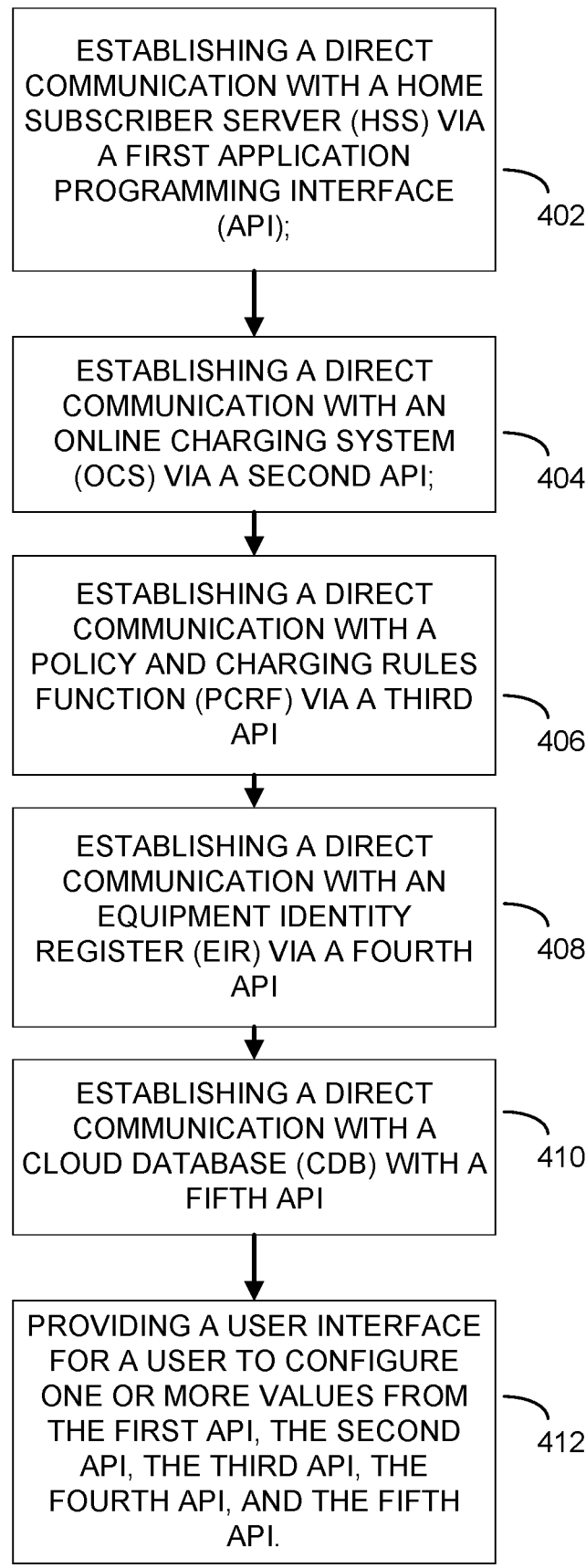
FIG. 4 is a flow chart illustrating a method for a system having an enhanced MaaP according to some embodiments.

Referring now to FIG. 4, a flowchart illustrates a computer-implemented method for an enhanced messaging platform according to some embodiments. In one embodiment, at 402, a direct communication may be established with a home subscriber server (HSS) via a first application programming interface (API).

At 404, a direct communication may be established with an online charging system (OCS) via a second API. Furthermore, a direct communication may b established with a Policy and Charging Rules Function (PCRF) via a third API at 406. Also, a direct communication may be established with an Equipment Identity Register (EIR) via a fourth API at 408. At 410, a direct communication may be established with a Cloud Database (CDB) with a fifth API. At 412, a user interface may be provided to a user to configure one or more values from the first API, the second API, the third API, the fourth API, and the fifth API.

It is to be understood that other APIs may be established or configured with other network nodes without departing from the scope and spirit of the invention. As discussed above, the enhanced MaaP 202 may directly communicate with the network nodes and the corresponding values, settings, and parameters without going through RCS. In another embodiments, the enhanced MaaP 202 may directly communicate with the network nodes and the corresponding values, settings, and parameters without going through a centralized or universal profile associated with the RCS.

Figure 5:
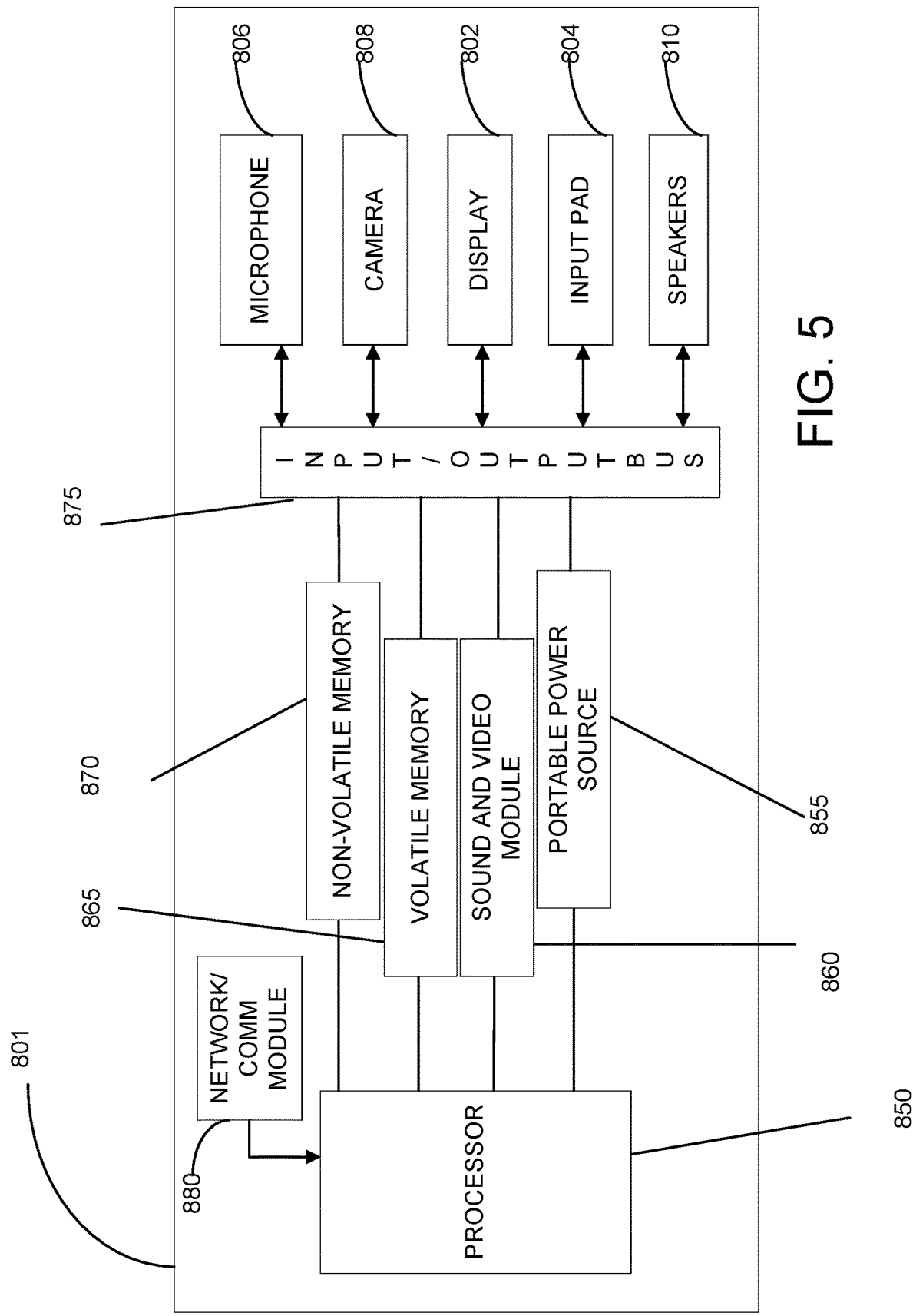
FIG. 5 is a diagram illustrating a portable computing device according to one embodiment.
Figure 6:
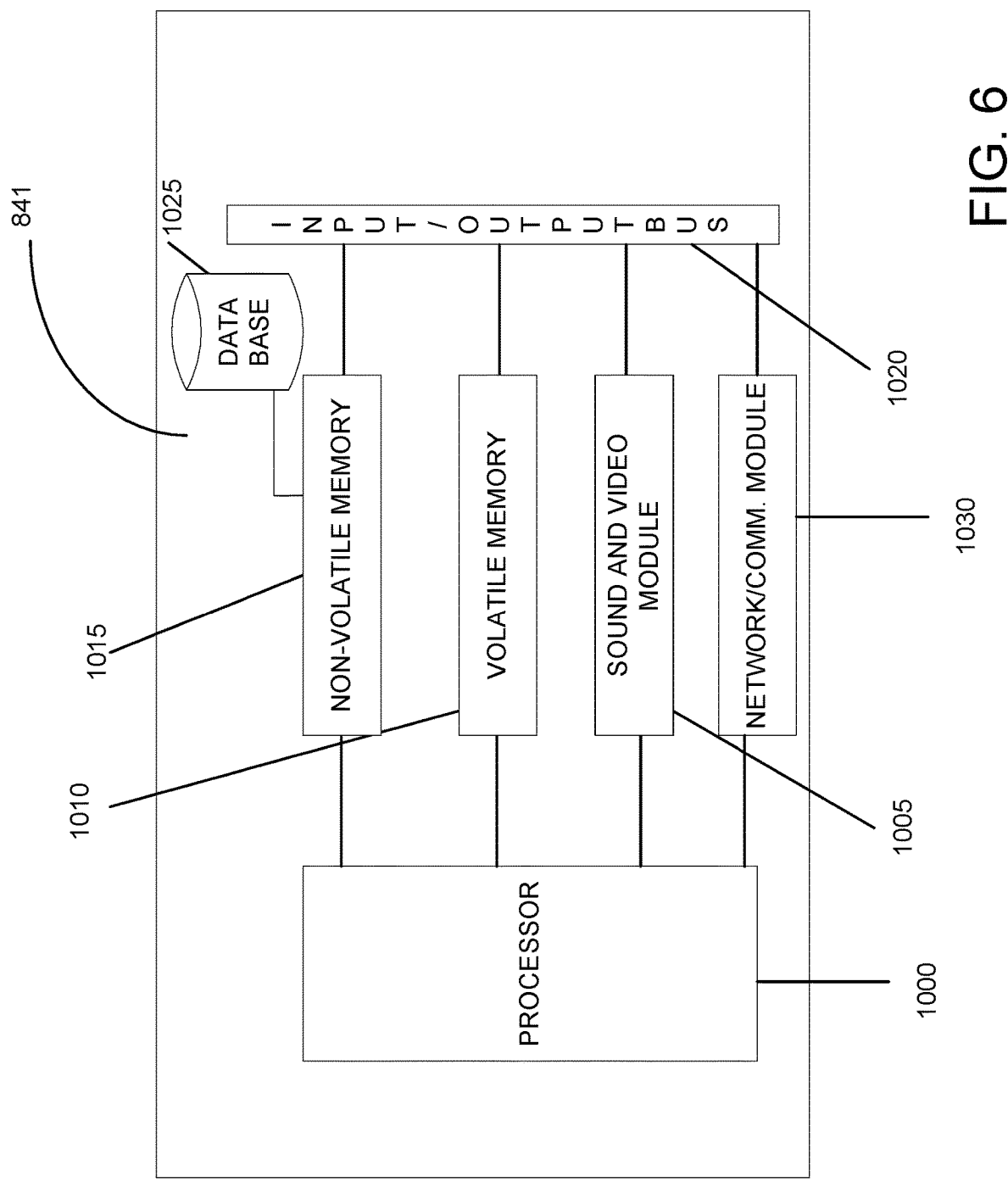
FIG. 6 is a diagram illustrating a computing device according to one embodiment.

FIG. 5 may be a high level illustration of a portable computing device 801 communicating with a remote computing device 841 in FIG. 6 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages and different API platforms.

In one embodiment, a portable computing device 801 may be a mobile device 108 that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

The portable computing device 801 may be able to communicate with a computing device 841 or a plurality of computing devices 841 that make up a cloud of computing devices 811. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi® (802.11 standard), BLUETOOTH, cellular communication or near field communication devices. The communication may be direct to the computing device 841 or may be through a communication network such as cellular service, through the Internet, through a private network, through BLUETOOTH, etc., via a network or communication module 880.

FIG. 5 may be a sample portable computing device 801 that is physically configured according to be part of the system. The portable computing device 801 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have non-volatile memory 870 and volatile memory 865. The network or communication module 880 may have GPS, BLUETOOTH, NFC, cellular or other communication capabilities. In one embodiment, some or all of the network or communication capabilities may be separate circuits or may be part of the processor 850. There also may be an input/output bus 875 that shuttles data to and from the various user input devices such as the microphone 806, the camera 808 and other inputs, such as the input pad 804, the display 802, and the speakers 810, etc. It also may control communicating with the networks, either through wireless or wired devices. Of course, this is just one embodiment of the portable computing device 801 and the number and types of portable computing devices 801 is limited only by the imagination.

As a result of the system, better information may be provided to a user at a point of sale. The information may be user specific and may be required to be over a threshold of relevance. As a result, users may use the APIs to gather information in a known format to make better informed and more efficient decisions. The system is more than just speeding a process but uses a computing system to achieve a better outcome.

The physical elements that make up the remote computing device 841 may be further illustrated in FIG. 6. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs such as the input pad 804, the display 802, and the speakers 810, etc. The input/output bus 1020 may also connect to similar devices of the microphone 806, the camera 808, the inputs such as the input pad 804, the display 802, and the speakers 810, or other peripheral devices, etc. The input/output bus 1020 also may interface with a network or communication module 1030 to control communicating with other devices or computer networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The user devices, computers and servers described herein (e.g., 801 or 841) may be computers that may have, among other elements, a microprocessor (such as from the Intel® Corporation, AMD®, ARM®, Qualcomm®, or MediaTek®); volatile and non-volatile memory; one or more mass storage devices (e.g., a hard drive); various user input devices, such as a mouse, a keyboard, or a microphone; and a video display system. The user devices, computers and servers described herein may be running on any one of many operating systems including, but not limited to WINDOWS®, UNIX®, LINUX®, MAC® OS®, iOS®, or Android®. It is contemplated, however, that any suitable operating system may be used for the present invention. The servers may be a cluster of web servers, which may each be LINUX® based and supported by a load balancer that decides which of the cluster of web servers should process a request based upon the current request-load of the available server(s).

The user devices, computers and servers described herein may communicate via networks, including the Internet, wide area network (WAN), local area network (LAN), Wi-Fi®, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of embodiments may become apparent to those skilled in the art upon review of the disclosure. The scope embodiments should, therefore, be determined not with reference to the above description, but instead should be determined with reference to the pending claims along with their full scope or equivalents.

One or more features from any embodiment may be combined with one or more features of any other embodiment without departing from the scope embodiments. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it may be understood by those of ordinary skill in the art having the present specification, figures and claims before them, that the corresponding structure includes a computer, processor, or microprocessor (as the case may be) programmed to perform the particularly recited function using functionality found in a computer after special programming and/or by implementing one or more algorithms to achieve the recited functionality as recited in the claims or steps described above. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one embodiments to the embodiments illustrated.

The present disclosure provides a solution to the long-felt need described above. In particular, the systems and methods overcome challenges of relying on existing practices of Messaging as a Platform—via RCS. Rather on relying on the RCS and its universal profile, aspects of the invention provide direct communications with network node entities and expose values, settings, and parameters with the MaaP so that user may also configure them.

Further advantages and modifications of the above described system and method may readily occur to those skilled in the art.

The disclosure, in its broader aspects, is therefore not limited to the specific details, representative system and methods, and illustrative examples shown and described above. Various modifications and variations may be made to the above specification without departing from the scope or spirit of the present disclosure, and it is intended that the present disclosure covers all such modifications and variations provided they come within the scope of the following claims and their equivalents.

The invention claimed is:

1. A computer-implemented method for an enhanced messaging platform comprising:
    establishing a direct communication with a Home Subscriber Server (HSS) via one or more application programming interfaces (APIs);
    establishing a direct communication with an Online Charging System (OCS) via the one or more APIs;
    establishing a direct communication with a Policy and Charging Rules Function (PCRF) via the one or more APIs;
    establishing a direct communication with an Equipment Identity Register (EIR) via the one or more APIs;
    establishing a direct communication with a Cloud Database (COB) with the one or more APIs; and
    providing a user interface for a user to configure one or more values from the one or more APIs;
    wherein the one or more APIs are configured to bypass Over The Top (OTT) applications, and
    wherein corresponding values, settings and parameters for the network nodes are transmitted via the one or more APIs without passing via Rich Communication Services (RCS).

2. The computer-implemented method of claim 1, wherein the messaging platform comprises a Message as a Platform (MaaP).

3. The computer-implemented method of claim 1, wherein the one or more APIs are configured to intercommunicate routing logics in response to automated chat session robots communications with subscriber profile commands.

4. The computer-implemented method of claim 1, wherein the one or more APIs are configured to intercommunicate by application-to-person (A2P) messaging capability in response to requests from automated chat session robots.

5. The computer-implemented method of claim 1, wherein the one or more APIs are configured to respond to application-to-person (A2P) messaging between automated chat session robots and subscribers.

6. The computer-implemented method of claim 1, wherein the direct communication comprises bypassing a universal user profile associated with the RCS.

7. A system comprising:
one or more processors; and
programming instructions that, when executed by the one or more processors, implement an enhanced messaging platform to perform operations including:
establishing a direct communication with a Home Subscriber Server (HSS) via one or more application programming interfaces (APIs);
establishing a direct communication with an Online Charging System (OCS) via the one or more APIs;
establishing a direct communication with a Policy and Charging Rules Function (PCRF) the one or more APIs;
establishing a direct communication with an Equipment Identity Register (EIR) the one or more APIs;
establishing a direct communication with a Cloud Database (COB) with the one or more APIs; and
providing a user interface for a user to configure one or more values from the one or more APIs;
wherein the one or more APIs are configured to bypass Over The Top (OTT) applications, and
wherein corresponding values, settings and parameters for the network nodes are transmitted via the one or more APIs without passing via Rich Communication Services (RCS).

8. The system of claim 7, wherein the messaging platform comprises a Message as a Platform (MaaP).

9. The system of claim 7, wherein the one or more APIs are configured to intercommunicate routing logics in response to automated chat session robots communications with subscriber profile commands.

10. The system of claim 7, wherein the one or more APIs are configured to intercommunicate by application-to-person (A2P) messaging capability in response to requests from automated chat session robots.

11. The system of claim 7, wherein the one or more APIs are configured to respond to application-to-person (A2P) messaging between automated chat session robots and subscribers.

12. The system of claim 7, wherein the direct communication comprises bypassing a universal user profile associated with the RCS.

13. A non-transitory computer storage medium having programming instructions stored thereon that, when executed by one or more processors, implement an enhanced messaging platform to perform operations comprising:
establishing a direct communication with a Home Subscriber Server (HSS) via one or more application programming interfaces (APIs);
establishing a direct communication with an Online Charging System (OCS) via the one or more APIs;
establishing a direct communication with a Policy and Charging Rules Function (PCRF) the one or more APIs;
establishing a direct communication with an Equipment Identity Register (EIR) the one or more APIs;
establishing a direct communication with a Cloud Database (COB) with the one or more APIs; and
providing a user interface for a user to configure one or more values from the one or more APIs;
wherein the one or more APIs are configured to bypass Over The Top (OTT) applications, and
wherein corresponding values, settings and parameters for the network nodes are transmitted via the one or more APIs without passing via Rich Communication Services (RCS).

14. The non-transitory computer storage medium of claim 13, wherein the messaging platform comprises a Message as a Platform (MaaP).

15. The non-transitory computer storage medium of claim 13, wherein the one or more APIs are configured to intercommunicate routing logics in response to automated chat session robots communications with subscriber profile commands.

16. The non-transitory computer storage medium of claim 13, wherein the one or more APIs are configured to intercommunicate by application-to-person (A2P) messaging capability in response to requests from automated chat session robots.

17. The non-transitory computer storage medium of claim 13, wherein the one or more APIs are configured to respond to application-to-person (A2P) messaging between automated chat session robots and subscribers.

18. The non-transitory computer storage medium of claim 13, wherein the direct communication comprises bypassing a universal user profile associated with the RCS.

* * * * *